US008797139B2

United States Patent
Lim

(10) Patent No.: US 8,797,139 B2
(45) Date of Patent: Aug. 5, 2014

(54) SYSTEM-LEVEL CHIP IDENTIFY VERIFICATION (LOCKING) METHOD WITH AUTHENTICATION CHIP

(75) Inventor: Cheow Guan Lim, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 237 days.

(21) Appl. No.: 13/403,462

(22) Filed: Feb. 23, 2012

(65) Prior Publication Data

US 2013/0222109 A1 Aug. 29, 2013

(51) Int. Cl.
*G05B 19/00* (2006.01)

(52) U.S. Cl.
USPC ..... 340/5.8; 340/10.5; 340/10.52; 340/12.18; 340/12.2; 340/568.1; 340/572.1

(58) Field of Classification Search
CPC . G06Q 20/40; G06Q 20/3278; G06Q 20/325; G06Q 20/4012; G06Q 20/32
USPC .................. 340/572.4, 10.5, 5.8, 10.1, 10.52, 340/12.18, 12.2, 568.1, 572.1
See application file for complete search history.

(56) References Cited

U.S. PATENT DOCUMENTS

| 5,886,634 | A * | 3/1999 | Muhme ..................... 340/572.1 |
|---|---|---|---|
| 6,961,000 | B2 * | 11/2005 | Chung ....................... 340/572.1 |
| 7,042,346 | B2 * | 5/2006 | Paulsen ........................ 340/438 |
| 7,098,793 | B2 * | 8/2006 | Chung ....................... 340/572.1 |
| 7,239,242 | B2 * | 7/2007 | Ghosh ........................ 340/572.1 |
| 7,348,887 | B1 * | 3/2008 | Warner et al. ............. 340/572.3 |
| 7,551,089 | B2 * | 6/2009 | Sawyer ...................... 340/572.4 |
| 7,571,263 | B2 * | 8/2009 | Campello et al. ............... 710/18 |
| 7,855,663 | B2 * | 12/2010 | Wilbrink et al. .............. 340/933 |
| 8,225,385 | B2 * | 7/2012 | Chow et al. ....................... 726/8 |
| 8,296,561 | B2 * | 10/2012 | Kanemura et al. ............ 713/155 |
| 8,412,857 | B2 * | 4/2013 | Ady et al. ......................... 710/8 |
| 8,534,550 | B2 * | 9/2013 | Faith et al. .................... 235/382 |
| 8,543,283 | B2 * | 9/2013 | Boss et al. ..................... 701/29.6 |
| 2007/0291988 | A1 * | 12/2007 | Karimov et al. .............. 382/103 |
| 2008/0091762 | A1 * | 4/2008 | Neuhauser et al. ........... 709/201 |
| 2009/0140040 | A1 * | 6/2009 | Wang et al. ................... 235/380 |
| 2013/0207783 | A1 * | 8/2013 | Cruzado et al. .............. 340/10.5 |

* cited by examiner

*Primary Examiner* — Daniel Wu
*Assistant Examiner* — Son M Tang
(74) *Attorney, Agent, or Firm* — Slater & Matsil, L.L.P.

(57) ABSTRACT

A system for authenticating electronic devices, particularly chips or integrated circuits is described. This allows authenticating that the devices are authorized by the original manufacturer for operation in critical applications.

27 Claims, 3 Drawing Sheets

SYSTEM-LEVEL CHIP IDENTIFY VERIFICATION (LOCKING) METHOD WITH AUTHENTICATION CHIP

BACKGROUND

Modern electronic systems typically comprise a plurality of integrated circuits (ICs) or chips, i.e., electronic devices, providing the functionality of the system. Reliable operation of such electronic systems is particularly important for circuits whose malfunction may be life threatening. For example, military electronic systems, which, for example, can be used for controlling weapons or for communicating data in critical situations, must be functional in a reliable matter. Similarly, civil systems incorporating such integrated electronic devices need to function reliably, i.e., for example, medical or aerospace systems. Consequently reliable function as specified for the particular IC or chip is essential for comprising the electronic system.

It is known that there is a grey market offering faked or counterfeit integrated circuits or chips, that is, where the IC was not produced by the original component manufacturer or an authorized manufacturer.

Furthermore there is a grey market for ICs that are not to be used any longer, for example, because their lifetime has exceeded its predefined lifespan. It is known that these ICs, for example, are removed from printed circuit boards to replace corresponding defective ICs. To prevent this kind of swapping conventional ICs can be equipped with production identity numbers to allow tracking and tracing of chips.

To prevent such undesired re-use of chips it is known that a lifespan counter can be implemented on a chip register, which may limit the lifetime of the chip or system. However, devices having such means for limiting lifetime are limited and in many cases can protect only the lifetime of the chip or the system from overall aging. It is known that circuitry including the chips and having a system failure allow such chips to be collected and reused in other systems, since the lifetime values of these chips are not expended.

When chips are reused in this way, the quality of a system can be compromised. In turn this can have larger impact including life threatening risks in systems mentioned above.

Accordingly there is a desire for a system that prevents the use or reuse of undesired devices, i.e., chips or ICs or even analog circuitry, in an electronic circuit, wherein an undesired device is one that the original manufacturer wants to exclude from being used in that individual system.

SUMMARY OF THE INVENTION

The proposed system relates to a system and a corresponding method for preventing the use of counterfeit or re-used electronic device, i.e., chips or ICs, in electronic circuitry. Each device is characterized by a unique identifier, thus being authenticable. The system at least comprises an additional authorization device having stored thereon unique identifiers of authenticable devices. At least upon the start of the system the unique device identifiers stored in each individual device is checked against the identifiers stored in the authentication device in order to authenticate, i.e., to prove that this individual device is authorized for operation.

BRIEF DESCRIPTION OF THE DRAWINGS

The features, aspects and advantages of the present invention will be better understood with regard to the drawings.

DETAILED DESCRIPTION OF ILLUSTRATIVE EMBODIMENTS

Figure 1:
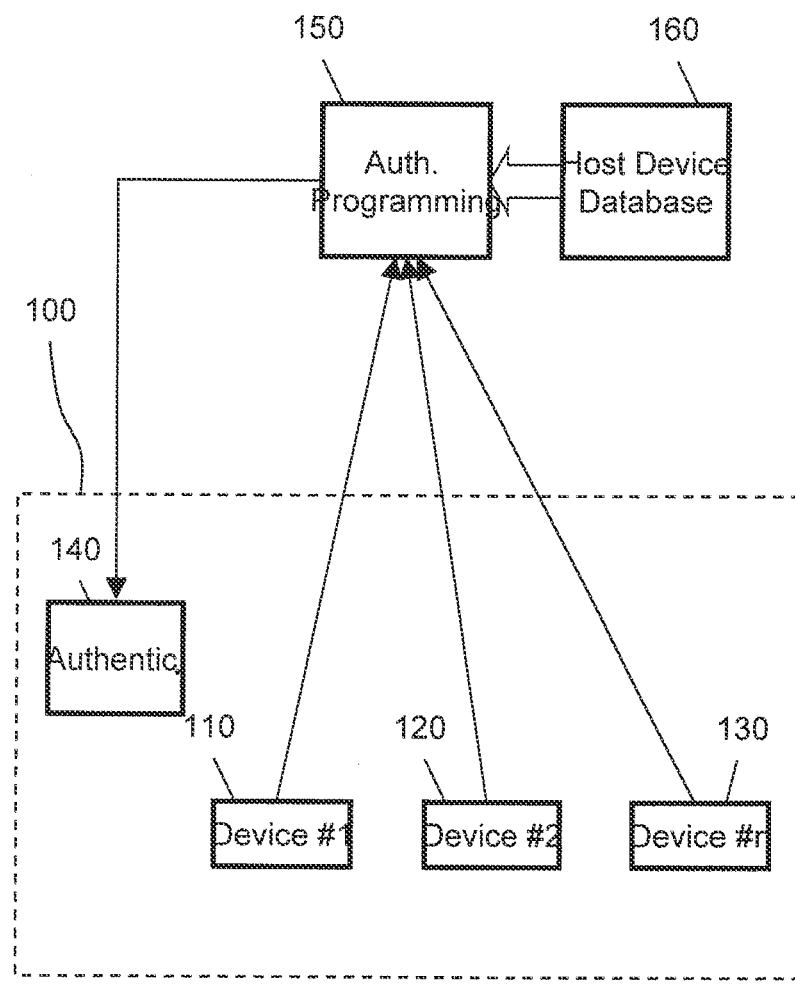
FIG. 1 depicts a schematic sketch of a system according to an embodiment of the invention when initializing the system.

The following schematic sketches illustrate of a system to prevent the use of electronic circuitry in an electronic system that the original manufacturer of the system has not authorized.

Note that in the following description the term "system" includes any electronic system comprising the electronic devices as described in the following. A system may thus comprise a plurality of devices, wherein the devices may be distributed over a single or a plurality of printed circuit boards. The system is a set of devices that allows operation of the comprised devices and use of their full functionality.

In the context of this description an electronic device can be an integrated circuit or chip or any other comparatively small circuitry that the original manufacturer intends to survey by the system. Typically such a device cannot be disassembled without damaging the device so that it becomes unusable, i.e., the device insofar is atomic, in order to prevent disassembling and reuse of the device. A device in this way shall denote the smallest entity that typically is assembled to a printed circuit board, for example, by soldering, and thus forms part of an electronic system and shall be controlled by the system.

Besides providing a particular functionality that may be typical for a device, each device 110, 120, 130 in the system is adapted and configured to store a unique device identifier, wherein the identifier cannot be easily manipulated once the identifier is written to and stored in the device. This may be provided, for example, by a one-time writable storage or by a hard-wired arrangement of gates, which cannot be manipulated once written. Alternatively a software solution may enable authorized access to the device for writing the device identifier. In that case the device is adapted and configured accordingly, i.e., the device checks and recognizes for an authorized access in case a write access to the identifier is detected. Furthermore each device is adapted and configured to communicate the identifier, for example, when requested. In the context of this description these devices are denoted as authenticable devices.

Furthermore each system comprises at least one authentication device. The authentication device can be a device as described above and in addition provides functionality for authenticating at least one authenticable device comprised in the system, i.e., the authentication device is adapted and configured to store authentication information of authenticable devices that shall be authorized for full functionality in the system. The authentication information uniquely reflects the unique identifier of a device. In one embodiment this can be a copy of the unique identifier of an authenticable device, i.e. a copy of the information as stored in an authenticable device to authenticate that device. In an alternative embodiment the authentication device may store a hash value of the unique identifier of an authenticable device to be authenticated for full functional use in the system.

Similar to one of the authenticable devices 110-130, the authentication device 140 may optionally store a unique identifier that uniquely identifies the authentication device itself. Insofar the authentication device can be authenticable.

Authentication device 140 is furthermore adapted and configured to calculate a hash value based on a hash key of each stored unique signature, i.e., a unique signature of each stored unique identifier including its own identifier, and to establish a secure communication session to a communication partner.

In one embodiment, authentication device 140 may optionally comprise means for storing and incrementing a unidirectional counter. The value of the unidirectional counter can be requested by a corresponding request message and can be incremented by a corresponding message. The value cannot be reset by a request message. However, the original manufacturer may provide special means, for example, a specially secured write mechanism for resetting or initializing the counter of the authentication device. This counter may provide the function of a lifespan counter.

FIG. 1 illustrates the preparation of a portion of an electronic system 100, wherein that preparation is performed at the original manufacturer of the system and prior to using the full functionality thereof.

The system may comprise a plurality of authenticable devices 110, 120, 130, these devices being adapted and configured at least as described above. Note that in this schematic sketch any wirings of the devices are not illustrated in order to not unnecessarily obscure the invention. To authenticate the authenticable devices, the system comprises at least one authentication device 140 as described above.

Authentication programming device 150 and host device database 160 serve to read the unique identifiers from the authenticable devices 110-130 and to store each unique identity on authentication device 140. The unique identifiers of authenticable devices 110-130 may be stored as raw data, i.e., in a clear text format, or as a hashed value, i.e., a hash value calculated from the clear text unique identifier. Note that the hash value of a clear text value is a unique fingerprint value of the clear text value, wherein the hashing calculation cannot be reversed, i.e., the clear text value cannot be re-calculated from the hash value.

Optionally at least one unique identifier of a host device is stored in the authentication device 140. The at least one unique host device identifier can be provided from host device database 160 having stored therein the at least one unique host device identifier. The unique host device identifier is used to authenticate the combination of a system 100 with a particular destined host when operating the system in combination with a host device as explained below. In case that a plurality of host device identifiers can be stored on authentication device 140, so a plurality of host devices corresponding to the stored host device identifiers can be used when operating the system.

Also optionally the unique host device identifier can be furthermore stored in the host device itself, which is not shown in FIG. 1, in order to provide each host device with a unique identifier used when authenticating devices in operation, the host device thus becoming authenticable in the system.

Note that this operation of storing the unique identifiers in authentication device 140 typically is performed at the original system manufacturer or a comparable authority, which in this way initializes the system for operation using the full functionality of each device in case the authentication procedure is passed successfully. For storing or writing the identifiers to each device 110-130, the authentication device 140 and a host device of the system manufacturer may take further security measures to prevent unauthorized access for writing to authentication chip 140.

Figure 2:
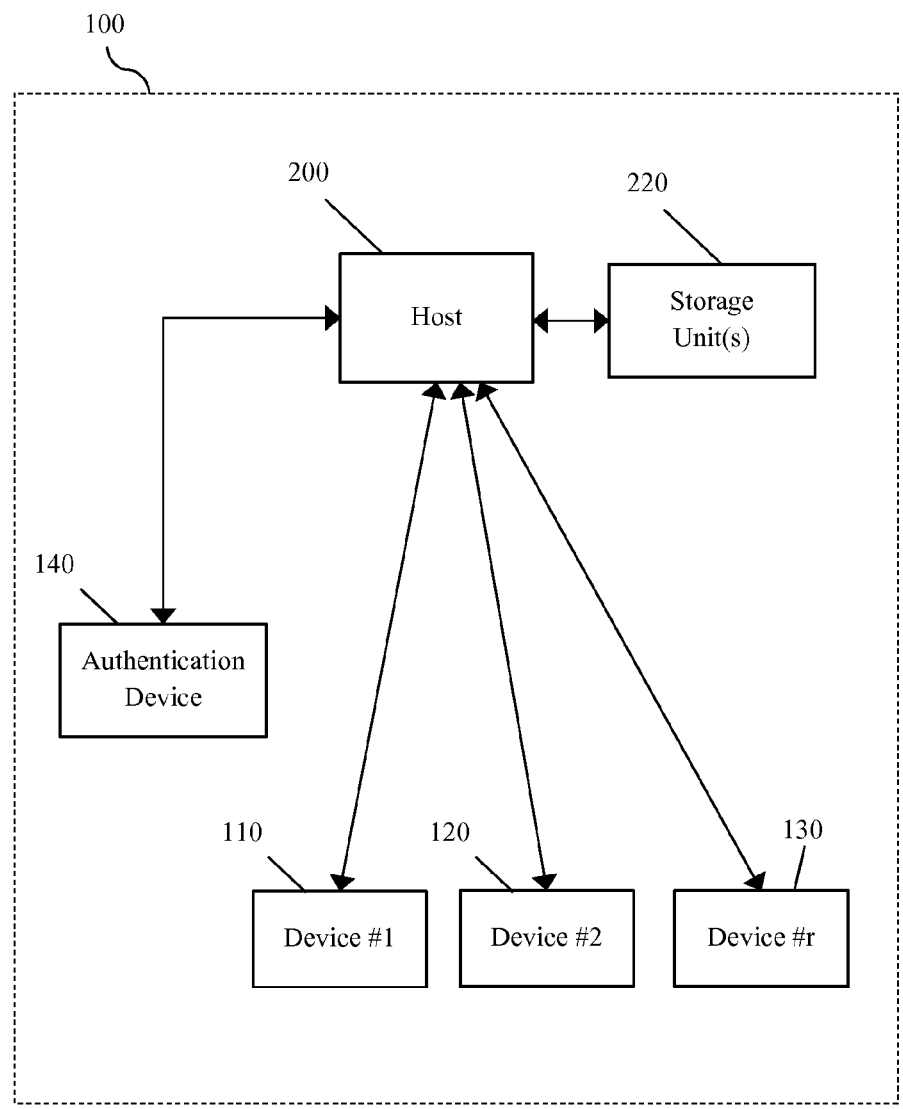
FIG. 2 depicts a schematic sketch of the system when operating the system.

FIG. 2 depicts a system according to an embodiment of the invention in normal operation, i.e., after the initialization steps described above have been performed. Normal operation of the system comprises authentication of devices used in the system including the authentication device to ensure that the devices are authorized by the original manufacturer or a corresponding authority for operation in that individual arrangement of the authenticable devices.

As illustrated in the sketch by the bidirectional arrows each of the authenticable devices 110-130 the authentication device 140, and one or more storage units 220 are communicatively coupled to host device 200 by a communication means that allows communication between host 200 and each of these devices. Each of the devices is adapted and configured correspondingly, i.e., each authenticable device and the authentication device comprise circuitry for communication that is configured for communication.

When checking the authenticity of the system, i.e., ensuring the authenticity of the individual arrangement of devices comprised in the system, host device 200 communicates with devices 110-140 as described in the following.

Figure 3:
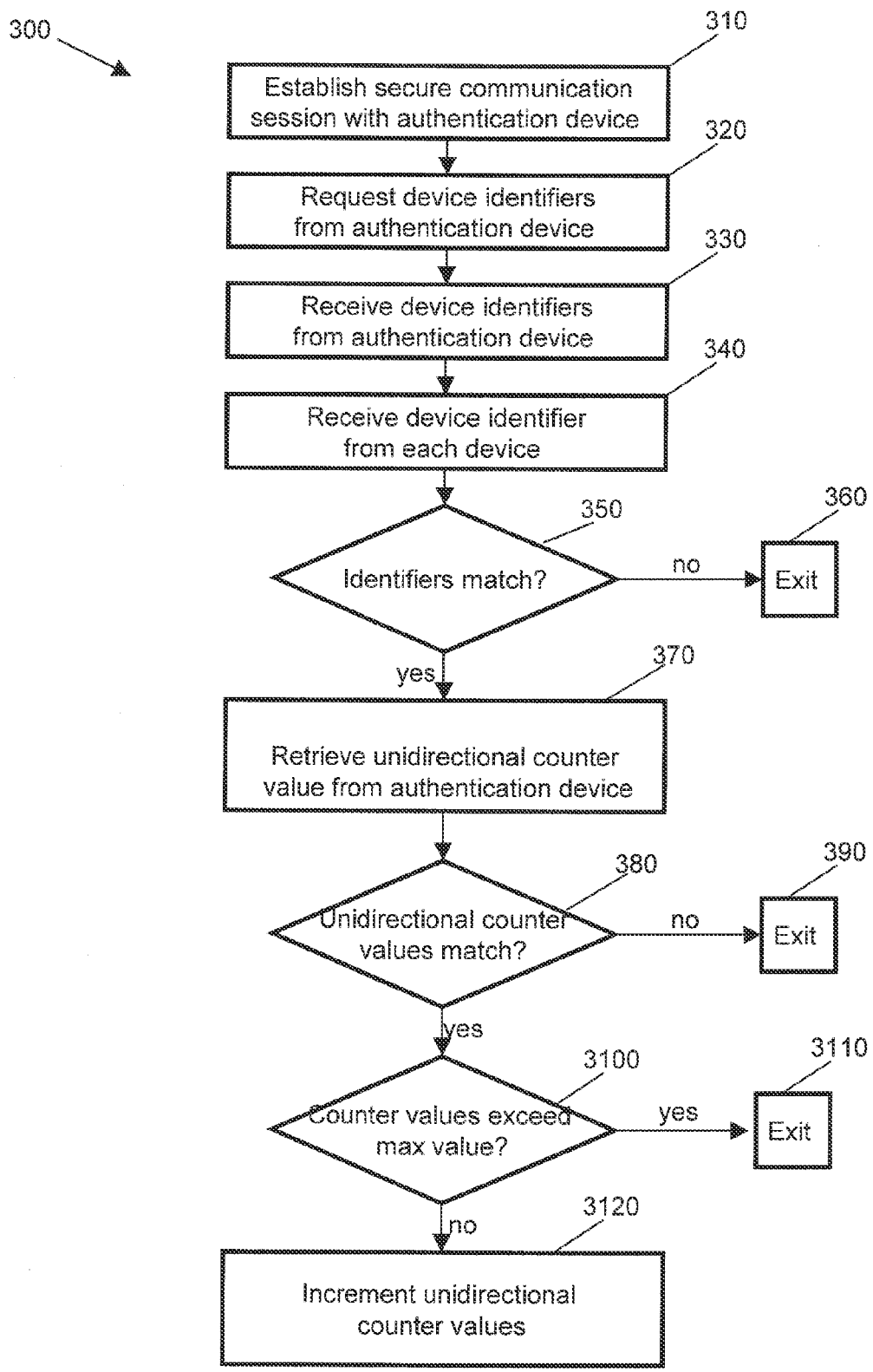
FIG. 3 depicts a flow chart illustrating a method for checking the authenticity of devices.

The flowchart as depicted in FIG. 3 illustrates an embodiment of the steps performed for checking the authenticity of the system, i.e., ensuring the authenticity of the individual arrangement of devices.

In this embodiment an individual identifier is stored in the host device. The host device is configured and adapted accordingly. The identifier of the host device is also stored in the authentication device.

Authentication of the devices typically is performed at the beginning of operation and may be additionally performed during operation of the system in order to ensure that the authenticable devices have not been replaced by other, non-authenticable devices during operation. The authentication procedure ensures that in an individual compilation of devices only the intended individual authenticable devices can be used. So even if a device is exchanged against another originally manufactured physically identical device, the exchanged device is not accepted by the system for operation since the system detects the exchange of a device as described hereinafter.

In one of the first steps of the authentication method 300, the host device establishes in 310 a secure communication session with the authentication device. In one embodiment this can be achieved by using conventional method steps. In one embodiment the host device may transmit a first message to the authentication device comprising the public portion of a public/private key pair. Note that the public key of a public/private key pair enables encryption only, whereas for decryption the public and the private key are needed. The authentication device may send a reply message to the host device comprising an encrypted symmetric key, i.e., a session key, which the host device and the authentication device may use for encrypting and decrypting messages. The host device may decrypt the encrypted symmetric key thus being able to encrypt and decrypt messages using that symmetric key as a session key. In this way the communication between the host and the authentication device is secured against undesired wiretapping.

In case the identifier of the authentication device has been stored in the host device, the host device may optionally send a request message to the authentication device requesting the identifier of the authentication device. The authentication device may accordingly transmit its identifier to the host device using the secure communication. Upon receipt the host device may then check the provided authentication device identifier with a corresponding identifier stored in the host device. Note that the authentication device may provide a hash value of its identifier, and the host device may use the provided hash value for verification. In this way the host device may ensure that it communicates to a particular individual authentication device, which has been authorized for communication with the host device by storing the authentication device identifier in the host device. In case the transmitted authentication device identifier differs from the corresponding identifier stored in the host device, the host device may raise a corresponding error action and may exit the authentication method thus preventing the use of the full functionality of the system. In case the host device finds that the provided authentication device identifier matches the transmitted identifier, the method may perform subsequent steps of the authentication method.

Also optionally and in case the host identifier has been stored in the authentication device, the authentication device may check the identifier of the host device. Note that these optional method steps are not reflected in FIG. 3. In one embodiment the authentication device may request the host device to transmit the host device identifier or a hash value of the host device identifier for the check. In case of matching host device identifiers the authentication device may further cooperate using the session key, otherwise the authentication device may refrain from cooperating in the actual session.

In an alternative embodiment the host device may request the host device identifier stored in the authentication device for checking that against the host device identifier as stored in the host device. The host device may transmit a corresponding request message and the authentication device may send a corresponding reply message comprising the host device identifier or a hash value thereof. In case of a mismatch the host device may refuse to continue the authentication method and may raise a corresponding error action. Otherwise the host device may continue the authentication method.

Subsequently to establishing the secure communication session between host device and authentication device or subsequently to the above mentioned optional steps, the host device may request the authentication device to transmit the device identifiers of the all devices, i.e., the host device transmits a request message to the authentication device requesting the device identifiers stored in the authentication device or hash values of the device identifiers. This is shown in step 320.

In step 330, the authentication device forms a corresponding response message and transmits the requested device identifiers or hash values thereof to the host device. In one embodiment the authentication device may furthermore compute a message authentication code (MAC) based on the session key and may transmit that MAC to the host device. In this way the host device retrieves the device identifiers of the devices comprised in the system.

In method step 340, the host device accesses each of the individual authenticable devices 110-130 and requests the unique identifier from each of them individually. This method step 340 comprises that the host device sends an individual request message to each authenticable device 110-130. Each authenticable device correspondingly transmits a corresponding response message to the host device, wherein the response message conveys the respective individual unique identifier of the responding authenticable device. In this way the host device may retrieve the device identifier of each authenticable device from each device directly. Note that this method step may comprise sending a plurality of request messages from the host to the authenticable devices 110-130, wherein the host accesses each device individually, and receiving a corresponding number of response messages originating from the plurality of responding devices. In case that one of the authenticable devices 110-130 does not respond to a request message originating from the host device 200, the host device detects a timeout situation, will accordingly raise an error action and will exit the authentication method thus preventing use of the full functionality of the system.

Note that the order of performing steps 330 and 340 may be changed arbitrarily (or performed simultaneously).

In step 350 the host device may check the device identifiers received from authentication device 140 with those retrieved from each authenticable device individually. Note that the host device either may compare the identifiers in clear text or the host device may compare hash values representing the identifiers. Matching identifiers indicate that authenticable devices 110-130 are authenticated by the data stored in authentication device 140. Hence the full functionality of each authenticable device may be used by the host device.

However, a mismatch of an identifier received from one of the authenticable devices 110-130 and its corresponding identifier provided by authentication device 140 indicates that either the authentication device or the authenticable device in question has been exchanged. In that case the host device will raise an error action and will not make use of the devices comprised in the system, thus preventing the use of the manipulated system (exit step 360).

In another optional embodiment the host device may optionally perform a further step to prevent an undesired manipulation by making use of the unidirectional counter of the authentication device. The host device may be adapted and configured accordingly to make use of the unidirectional counter as described in the following.

The host device may request in step 370 from the authentication device the value of the unidirectional counter of the authentication device. This can be achieved by transmitting a corresponding request message from the host device to the authentication device. The authentication device reads the counter value and transmits a corresponding reply message to the host device, which is additionally secured by calculating and transmitting a related MAC based on the session key.

The host device is adapted and configured to equally maintain a unidirectional counter. Both unidirectional counters, i.e., the counter in the authentication device and the corresponding counter in the host device, start at the very first contact from the same initialization value, which in one embodiment may be zero. Both counters are incremented equally. Accordingly the counter values are equal as long as none of the two devices is exchanged or manipulated.

The host device optionally may request in 370 the counter value from the authentication device, which can be done by sending a corresponding request message. The authentication device is expected to send a corresponding response message comprising the counter value or a hash value thereof in a reply message, which can be secured by MAC. The host device then compares in the received counter value with the counter value stored in the host device.

Mismatching counter values indicate that either the host device or the authentication device has been exchanged. Accordingly, when the host device upon comparing the counter values finds a mismatch, it may exit the authentication method in 390 and raise an error action. The action may comprise to transmit a control message to the authentication device to set the counter value to the maximum, thus marking the authentication device for not being usable.

Optionally the host device may further check in 3100, whether the counter values have reached a predefined maximum value. In case the maximum counter value is reached, the host device exits the authentication method in 3110 and raises an error action.

In case the counter values do not exceed the maximum value, the host device in 3120 may increment the counter value stored in the host device and may correspondingly send a control message to the authentication device to increment the counter value correspondingly.

Since the check of the device identifiers has revealed matching identifiers, which indicates an unmodified system, and optionally has checked the unidirectional counters for matching values and further optionally against a maximum allowed counter value, the host device may start normal operation using the full functionality of the devices.

In another optional embodiment the host device is adapted and configured for checking the authenticable devices or the authentication device for malfunctions or failures in their functions or communication to the host device. This method step can be performed optionally when performing step 340. The authenticable devices and the authentication device are adapted correspondingly to detect and communicate malfunctions to the host device accordingly. Upon communication of such failure to the host device, the identifier or information of the device's failure shall be recorded in the authentication device before the failure is notified to the user. For communicating information about device failures the hashed information transmitted between the devices can be extended to comprise information about failures. The process steps of hashing the device identifiers or forming the transmitted messages in the authentication device or authenticable devices are adapted accordingly to include the failure information before communicating the message to the host. When a host device receives the message comprising the failure information, the host device can identify the occurrences of failure. In addition, if special failure codes are used for different devices or types of failures, the host device may calculate a hash value of a failure code with the identifier values to look for matching information received from the authentication device to identify the failure mechanism and to use this mechanism of tracking failures to further prevent the use of not authenticated or malfunctioning devices.

In still another optional embodiment the host device may be adapted and configured to internally store information communicated from an authentication device or an authenticable device about failures detected therein. Accordingly, when a host detects a malfunction of the authentication and/or authenticable device, or a repetitive count of communication failure to any of the authentication or authenticable devices, the host device can register the device(s) as having device failure in its host system to extend protection against authentication device duplication by brute-force copying of the authentication device information onto a device or in protection against unauthorized removal. This embodiment includes also protecting over host power-off, on re-powering-up, the host device can deny all previous registered identifiers. Specifically when a repetitive count of communication failures and power-up denials for registered devices is detected, then unauthorized removal of a module including all authentication or authenticable devices can be detected. In this case the host device may deny further attempts to cooperate with that module. Only a special clearance verification method may re-enable a device with registered identifiers for further use.

What is claimed is:

1. An electronic system comprising:
at least one authenticable electronic device having stored therein a unique identifier that uniquely identifies the electronic device, the electronic device being configured to communicate the unique identifier; and
an authentication device having stored therein at least the unique identifier of each authenticable electronic device and a unique identifier that uniquely identifies the authentication device, the authentication device including a first unidirectional counter, wherein the authentication device is configured to communicate the unique identifiers and a counter value of the first unidirectional counter to a host device upon request, and wherein the counter value of the first unidirectional counter is configured to be compared with a value of a second unidirectional counter stored at the host device to authenticate the authentication device.

2. The electronic system of claim 1, further comprising a host device, which is configured to communicate with the authentication device and each authenticable device of the system.

3. The electronic system of claim 2, wherein the host device is configured to store and increment the second unidirectional counter, to retrieve the unique identifiers from the authentication device and from each authenticable device, to compare the unique identifiers to authenticate each of the authenticable devices, to retrieve the counter value from the authentication device, and to compare the counter value with the value of the second unidirectional counter to authenticate the authentication device.

4. The electronic system of claim 2, wherein the host device is configured to request the unique identifiers from the authentication device and from each authenticable device, and to compare the identity of the identifiers.

5. The electronic system of claim 2, wherein the host device and the authentication device are configured to establish a secure communication session.

6. The electronic system of claim 2, wherein at least one of an authenticable electronic device or the authentication device is configured to detect a malfunction and to communicate information related to the detected malfunction to the host device.

7. The electronic system of claim 6, wherein the host device is configured to receive and process a communication that comprises information about the detected malfunction.

8. The electronic system of claim 7, wherein the host device is configured to store information about the detected malfunction.

9. The electronic system of claim 2, wherein the first unidirectional counter and the second unidirectional counter are initially set to the same initialization value.

10. The electronic system of claim 9, wherein the first unidirectional counter and the second unidirectional counter are incremented synchronously, and wherein the first unidirectional counter and the second unidirectional counter have the same value unless the host device or the authentication device is replaced or otherwise compromised.

11. An electronic system comprising:
a plurality of authenticable devices, each having stored a unique identifier and each being configured to communicate the unique identifier;
an authentication device configured to store each unique identifier of each of the plurality of authenticable devices and a unique identifier that uniquely identifies the authentication device and to communicate the identifiers, wherein the authentication device includes a first unidirectional counter; and
a host device comprising a second unidirectional counter, the host device being configured to receive the identifiers from the authentication device and from each of the authenticable devices individually, to compare the identifiers received from the authentication device against the identifiers received from each authenticable device, to retrieve the counter value from the authentication device, and to compare the counter value with a value of the second unidirectional counter to authenticate the authentication device, wherein the host device is configured to prevent use of the full functionality of the electronic system when the identifiers do not match.

12. The electronic system of claim 11, wherein the host device is configured to instruct or otherwise prompt the authentication device to increment the first unidirectional counter, and to increment a counter value stored in the host device.

13. The electronic system of claim 11, wherein at least one of an authenticable electronic device or authentication device is configured to detect a malfunction and to communicate information indicating the detected malfunction to the host device.

14. The electronic system of claim 13, wherein the host device is configured to receive and process a communication from the at least one authentication or authenticable device, wherein the communication comprises information about the detected malfunction.

15. The electronic system of claim 14, wherein the host device is configured to store information about the detected malfunction.

16. A method for authenticating devices of an electronic system, the method comprising:
    receiving at least one unique identifier from an authentication device, wherein the unique identifier identifies an authenticable electronic device of the electronic system;
    receiving the unique identifier from the at least one authenticable electronic device of the electronic, system;
    comparing the at least one unique identifier received from the authentication device and from the authenticable electronic device;
    receiving, by a host device, a counter value from the authentication device, the counter value being a value of a first unidirectional counter stored in the authentication device, wherein the host device stores a second unidirectional counter;
    comparing the counter value with a value of the second unidirectional counter to authenticate the authentication device; and
    preventing use of the at least one authenticable electronic device if the compared identifiers do not match.

17. The authentication method of claim 16, further comprising establishing a secure communication session between the authentication device and the host device.

18. The authentication method of claim 16, further comprising:
    incrementing the value of the second counter stored in the host device; and
    instructing or otherwise prompting the authentication device to increment the value of the first unidirectional counter stored in the authentication device.

19. The authentication method of claim 16, further comprising controlling the authentication device to set a value of the first unidirectional counter stored to a predefined maximum value.

20. The authentication method of claim 16, wherein the host device and the authentication device are arranged on separate printed circuit boards.

21. The authentication method of claim 16 further comprising:
    detecting a malfunction in at least an authenticable electronic device or the authentication device; and
    communicating information about the detected malfunction to the host device.

22. The authentication method of claim 21, further comprising:
    receiving and processing a communication from one of an authenticable electronic device or the authentication device, the communication comprising information about the detected malfunction; and
    storing information in the host device about the detected malfunction.

23. The authentication method of claim 16, wherein the first unidirectional counter and the second unidirectional counter are initially set to the same initialization value, wherein the first unidirectional counter and the second unidirectional counter are incremented synchronously, and wherein the first unidirectional counter and the second unidirectional counter have the same value unless the host device or the authentication device is replaced or otherwise compromised.

24. A device capable of authenticating an authenticable electronic device, the device comprising:
    one or more storage units configured to store a unique identifier received from the authenticable electronic device, to store a unique identifier received from an authentication device, and to store a counter value received from the authentication device, the counter value being a value of a first unidirectional counter stored in the authentication device;
    a second unidirectional counter; and
    a comparison circuit configured to compare the unique identifier received from the authenticable electronic device with the unique identifier received from the authentication device, and to compare the value received from the authentication device with a value of the second unidirectional counter to authenticate the authentication device, wherein authentication of the authenticable electronic device is based at least partially on a result of comparing the unique identifier received from the authenticable electronic device with the unique identifier received from the authentication device.

25. The device of claim 24, further comprising a communication unit configured to establish a secure communication session.

26. The device of claim 24, further comprising a receiving unit configured to receive information related to a malfunction from the authentication device or the authenticable electronic device.

27. The device of claim 24, wherein the first unidirectional counter and the second unidirectional counter are initially set to the same initialization value, wherein the first unidirectional counter and the second unidirectional are incremented synchronously, and wherein the first unidirectional counter and the second unidirectional counter have the same value unless the device or the authentication device is replaced or otherwise compromised.

* * * * *